May 6, 1924. Re. 15,831

W. E. WINE

CAR DOOR LOCKING DEVICE

Original Filed Jan. 12, 1922

Inventor

William E. Wine by Fitler & Meehlin his Attorneys

Reissued May 6, 1924. Re. 15,831

UNITED STATES PATENT OFFICE.

WILLIAM E. WINE, OF TOLEDO, OHIO.

CAR-DOOR-LOCKING DEVICE.

Original No. 1,431,508, dated October 10, 1922, Serial No. 528,649, filed January 12, 1922. Application for reissue filed March 14, 1924. Serial No. 699,203.

*To all whom it may concern:*

Be it known that I, WILLIAM E. WINE, a citizen of the United States, residing at Toledo, in the county of Lucas and State of Ohio, have invented certain new and useful Improvements in Car-Door-Locking Devices, of which the following is a specification.

My invention relates to new and useful improvements in car door locks, and has for its object to provide a lock involving a bracket or base plate designed to be secured to the side of a freight car and on which is eccentrically mounted a hook for supporting a drop bottom door both in closed and in partly open position, the hook being adapted to be actuated to raise the door from its partly open position to its position of final closure, in which latter position it will remain locked until the hook is manually operated to release the door.

As is well known to those skilled in the art, drop bottom doors are easily swung or manipulated towards closed position until final closure is almost reached. It often happens that the doors become distorted or warped in service or small particles of coal or other substances find lodgement along the sides or hinge edge of the door, thus necessitating the application of great force to the door in order to bring it to final closed position.

Another object of the invention is to provide a hook which cooperates with a transversely mounted angle on the door to support the latter in partially closed position, the said hook being eccentrically mounted on the car through the intervention of a pivoted eccentric upon which said hook is rotatable, the eccentric being adapted to be rotated on its pivotal axis by means of a wrench so as to cause the axis of rotation of the said hook to be swung upwardly beyond the pivotal axis of the eccentric and thus raise the hook and door and lock the door in its closed position.

Another object of my invention is to provide an eccentrically mounted pivoted hook cooperating with a hinged door and adapted to releasably maintain said door in either of two positions, the said hook being movable from one of said positions to the other by a rotation of said eccentric mounting.

A further object is to provide a hook pivotally mounted upon an eccentric hub and adapted to releasably maintain a door in a plurality of positions, in combination with means for rotating said hub to move said hook from either of said positions to the other.

A still further object is to provide a locking device consisting of a bracket supporting an eccentrically mounted hook and a dog for cooperating with the hook to prevent accidental release of the hook when the latter is in locked position. By reason of its eccentric mounting the hook maintains its locked position and the dog provides further means for preventing the hook from executing releasing movement, thus rendering it impossible for the hook to move to open position except the device be manually actuated.

Still another object of the invention is to provide for drop bottom doors easily operated and relatively cheap locking means consisting of a few strong parts.

With these and other objects in view my invention consists in certain novel features of construction and parts as will be hereinafter more fully described and pointed out in detail in the claims.

Referring now to the drawings showing a preferred embodiment of the invention,—

Figure 1:
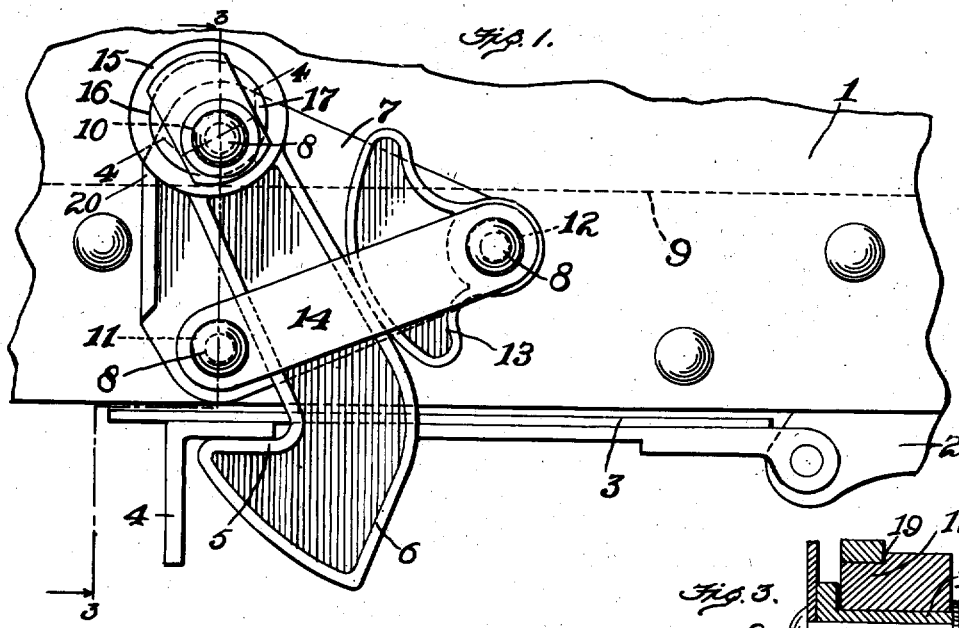
Figure 1 is a side elevation of the locking device, and a fragmentary portion of the side of a car, showing one edge of a drop bottom door, the door being in its closed and locked position.

In the drawings, the numeral 1 designates a fragmentary portion of the side of a car, 2 a bracket suitably secured to the car and to which in turn is hinged in any convenient manner a door 3. The door is provided adjacent its free end with a stiffening member 4 preferably in the form of an angle iron one end of which projects beyond the free edge of the door to afford a supporting ledge adapted to be engaged by the coacting supporting ledge 5 of a hook 6.

The hook 6 is pivotally mounted upon a plate or bracket 7 which may conveniently be of triangular shape and is connected to the car side by a plurality of fastening means or rivets 8, the latter being extended through the car side 1 and if desired through a reinforcing plate 9, as clearly shown. The bracket or plate 7 is preferably provided with a plurality of hollow posts or studs 10, 11 and 12 through which the rivets 8 hereinbefore mentioned extend. The hook 6 is pivotally mounted upon the post 10 in a manner hereinafter described, while the post 12 preferably provides a pivotal mounting for the locking cam or dog 13 adapted to engage with the said hook for maintaining the latter in locked position. The posts 11 and 12 may advantageously be connected by a strap or bar 14 between which and the adjacent face of the plate 7 are positioned the hook 6 and the cam or dog 13, which pivoted parts are thereby supported against transverse movement. The post 11 is adapted to engage the shank of the hook 6 to limit its swing in one direction.

The hook 6 is provided at its upper end with an enlarged head 15 having a cylindrical opening 16 within which rotatably fits a circular hub 17, the latter being eccentrically and pivotally mounted upon the post 10. The hub 17 projects outwardly from the plane of the head 15 of the hook 6 and is cut away on opposite sides of its center so as to form a wrench receiving portion. The hub is slightly reduced in diameter, as at 19, thus providing shoulders adapted to engage the head 15 of the hook to prevent transverse movement of the latter on the said hub.

Figure 3:
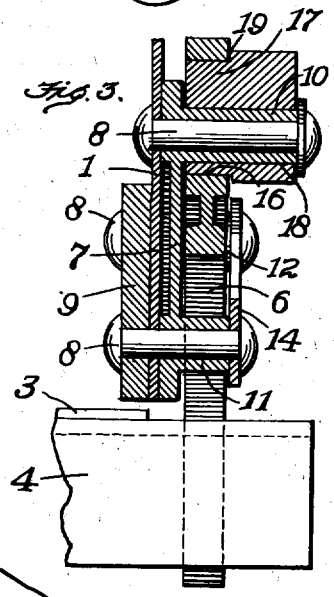
Figure 3 is a detail sectional view taken on line 3—3 of Fig. 1.
Figure 4:
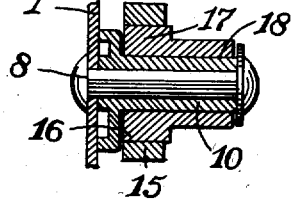
Figure 4 is a sectional view taken on line 4—4 of Fig. 1.
Figure 2:
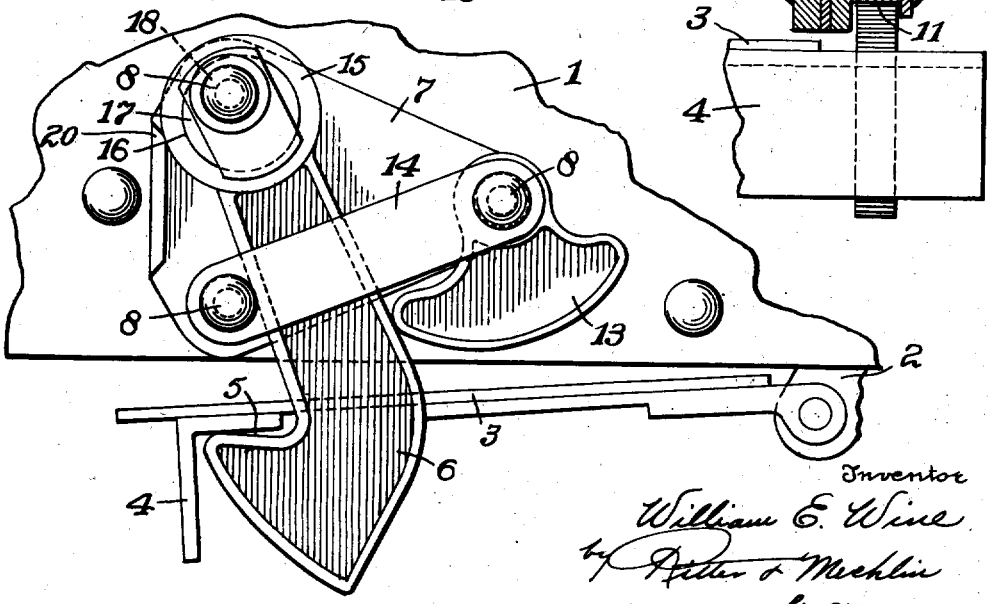
Figure 2 is a similar view, but showing the door in a temporarily supported or partly closed position, the locking dog being in its unlocked position.

It will be seen that when the hub 17 and hook 6 are in locked positions, as shown in Figs. 1 and 3, the hook will remain in its uppermost or locked position, as its downward pull upon the eccentric hub passes to that side of the hub pivot 10 which tends to induce a counter-clockwise or locking rotation of the hub 17. As shown in Fig. 1, the counter-clockwise rotation of the hub 17 upon the stud 10 is arrested when the hub is slightly past dead center by the periphery of the head 15 of the hook coming into engagement with the upper end of the rib or stop 20 on the bracket 7. The stop 20 also acts in a similar manner, as shown in Fig. 2, to limit the clockwise or releasing rotation of the eccentric hub 17, thus controlling the extent to which the hook is lowered.

The operation of the device is as follows:—With the parts in the position shown in Fig. 2 and the door 3 open, the door can be raised by hand to the position shown in said figure. The hook 6 being free to swing rearwardly permits the horizontal flange of the angle iron 4 to force the hook rearwardly until the flange is raised above the supporting ledge 5, whereupon the hook will drop into engagement with the under face of the flange and maintain the door in partly closed position. To raise the door from the position shown in Fig. 2 a wrench or other suitable tool is applied to the squared portion of the hub 17 and the latter is rotated in a counter-clockwise direction until it has assumed the position shown in Fig. 1, where, as has been already noted, the eccentric has passed slightly beyond dead center. In this position the eccentric hub forms an automatic lock for retaining the hook and door in the position shown in Fig. 1. Thereafter the locking dog or cam many be driven in behind the hook, thus retaining the latter locked against possible disengagement. To release the door it is only necessary to disengage the cam or dog 13 and to pry or force the hook 6 rearwardly off the ledge of the angle bar 4, the hook rotating on the cylindrical portion of the hub 17. To afford great strength without unduly increasing the weight of the parts the plate or bracket 7 may be flanged on its back or inner face and the hook 6 may also be flanged, as shown in the several figures, although, of course, this is not absolutely necessary.

From the foregoing it will be seen that I have provided a locking device which is exceedingly simple, compact, strong and easy to operate. Due to the eccentric mounting of the hook, the door may be supported thereon in a temporary position, and while still remaining seated upon the hook may be raised to its final closed position, sufficient force to rotate the eccentric hub 17, to thus effect an upward movement of the hook resulting in the closing of the door, being readily exerted upon the eccentric by the application of a wrench thereto.

Many slight changes may be made without in any way departing from the spirit and scope of the invention.

What I claim and desire to secure by Letters Patent is:—

1. A locking device for car doors comprising a base, a bearing post formed on said base, a hook having an enlarged head eccentrically mounted on said bearing post and adapted to support and lock a door in its closed position when said hook is revolved to its locked position.

2. A locking device for car doors comprising a base, said base provided with a bearing post, a hook having an enlarged head thereon, a hub within said head, and said hub eccentrically mounted on said bearing post, said hook adapted to engage and support a door when in one position and when revolved to raise the door to its final position and support and lock the same in said position.

3. A locking device for car doors comprising a base plate provided with bearing posts thereon, a hook having an enlarged circular head formed with an opening therein, a hub within said head, said hub eccentrically mounted on one of said bearing posts, a strap extending from two of said posts and a dog pivotally mounted on one of said bearing posts to further retain the hook in its final position.

4. In combination with a freight car having a swinging door, a locking device secured to the car body, said door being provided with an outwardly extending ledge, said locking device comprising a base plate secured to the car body and provided with a bearing post, a hook provided with an enlarged head having an opening therein, and a hub within said opening, said hub being pivotally and eccentrically mounted on said bearing post, the lower end of said hook being adapted to engage the ledge on said door to support the same in a temporary position, and the upper end of said hook being adapted to revolve on said head so that said door will be raised and locked in its closed position.

5. In combination with a car body having a drop door provided with an outwardly extending ledge, a locking device for the door comprising a base secured to the car body near a free edge of said door, said base being provided with a bearing post, a hook provided with a head having an opening therein, and an eccentrically mounted hub rotatable within said opening and extending outwardly beyond the head of said hook to present a portion whereby the hub may be rotated on said post, said hook when in its lowermost position being adapted to engage the said ledge on the door to support the door in a partly closed position, and said hook serving to raise the door and lock it in raised position when said hub is revolved in one direction on its pivotal axis.

6. In combination with a freight car having a drop bottom door provided with a ledge in the form of an angle iron extending beyond a free edge of the door, a locking device comprising a base plate rigidly secured to the side of the car above said angle iron, a plurality of posts carried by said base plate, a hook having an enlarged head provided with an opening therein, a hub fitting within said opening and eccentrically mounted on one of said posts, a dog pivotally mounted on another of said posts, and a strap extending between a plurality of said posts and overlying said hook and dog, said hook being adapted to engage the angle on said door and support the door in a partly open position and to raise and lock said door in its closed position when the hub is revolved.

7. In combination with a car having a drop bottom door provided with a ledge extending beyond the free edge thereof, a locking device comprising a triangular base plate secured to the car body, and above said ledge, bearing posts formed on said base plate, a hook having an enlarged head provided with an opening therein, a rotatable hub in said opening eccentrically mounted on the uppermost of said bearing posts, said hub having two flat sides to present a gripping surface, a strap extending between two of said posts to prevent transverse movement of said hook, said hook when lowered by the revolving of said hub engaging the ledge on said door and supporting the same in a partly closed position and raising and locking the door when said hub is revolved, and means mounted on the rear-most bearing post for further holding the eccentrically mounted hook in its locked position.

8. In combination with a car having a drop door provided with a ledge extending beyond the side thereof, a locking device comprising a base plate rigidly secured to the car body above the ledge on the car door, a bearing post carried by said base, and a hook movably mounted on said bearing post through eccentric means pivotally mounted on said post, said eccentric means supporting the upper end of said hook in a manner allowing the latter to be swung to one side of said post, and said means also presenting a portion adapted to be engaged by an instrument for manually actuating the said hook; said hook supporting the door in a partly closed position when said hook is in its lowermost position and raising and locking the door in a closed position when the hook is swung to its upper position.

9. In a door arrangement for railway cars, a door hinged to the car body, a bracket carried by the car, a door supporting member pivotally mounted on said bracket and arranged for engagement with a portion of the door, and a movable spool eccentrically mounted on said bracket, said supporting member having a circular aperture therein, and said spool extending into and being rotatable within the aperture of said door supporting member and being provided with means whereby said spool may be rotated.

10. A locking device for car doors, involving a bracket provided with a bearing post, a hook having a head formed with an opening affording a circularly curved surface, a hub within said head cooperating with said curved surface and eccentrically mounted on said bearing post, and pivotally mounted means for retaining said hook in locked position.

11. A locking device for car doors, involving a base, a bearing formed on said base, a pivoted hook having an enlarged head formed with an aperture therein, and a rotatable eccentric mounted on said bearing, said bearing and said eccentric extending into said aperture, and said hook being adapted to support and lock a door in closed position when said eccentric is revolved in one direction.

12. A locking device for car doors involving a rotatable eccentric, a bearing member forming a pivotal mounting for said eccentric, and door supporting means having an aperture therein for receiving said eccentric, the pivotal axis of said eccentric being within said aperture, and said door supporting means and eccentric being relatively movable.

13. A locking device for car doors involving a rotatable eccentric, means for rotatably mounting said eccentric, and door supporting means adapted to be shifted from one position to another by said eccentric, said eccentric and said door supporting means having curved cooperating bearing surfaces, and the axis of rotation of said eccentric being disposed between said bearing surfaces and the center of curvature of said eccentric.

14. A locking device for car doors involving a rotatable eccentric, means for rotatably mounting said eccentric, door supporting means adapted to be shifted from one position to another by said eccentric when the latter is rotated, and movable means for preventing a relative rotary movement of said eccentric and door supporting means corresponding to a door releasing movement of said last named means, said eccentric and said door supporting means having cooperating circularly curved bearing surfaces passing around the axis of rotation of said eccentric.

15. A locking device for car doors involving an eccentric having a circularly curved bearing surface, means for rotatably mounting said eccentric, a door supporting hook adapted to be actuated by said eccentric, said hook having a bearing surface engaging the said bearing surface of the eccentric, means for limiting the rotation of said eccentric in one direction, and releasable means for preventing accidental rotation of said eccentric in the opposite direction, the axis of rotation of said eccentric being disposed between the circularly curved bearing surface of the said eccentric and the center of curvature of said surface.

16. A locking device for car doors involving a rotatable eccentric, means for rotatably mounting said eccentric on the car body, a door supporting hook adapted to be actuated by said eccentric when the latter is rotated, and means movably mounted on the car body for locking said hook to prevent an opening movement of said door, said eccentric and hook having engaging circularly curved bearing surfaces, the axis of rotation of said eccentric being positioned within said curved bearing surfaces, and said eccentric being adapted to be rotated by a lever device.

17. A locking device for car doors involving a rotatable eccentric, means for rotatably mounting said eccentric, and door supporting means rotatably connected to said eccentric and adapted to be shifted from one position to another when said eccentric is rotated, said door supporting means being adapted to rotate on and independently of said eccentric so as to assume a position permitting the door to open.

18. A locking device for car doors involving door supporting means, and a device for movably mounting said door supporting means so as to permit the latter to execute turning movements about independent axes, one of said axes being fixed and the other being movable with said door supporting means, the said door supporting means being adapted upon executing simultaneous turning movements about both of said axes to shift its position and effect a corresponding shifting of the door, and being adapted upon executing a turning movement about a single one of said axes to assume a position permitting the door to open.

In testimony whereof I affix my signature.

WILLIAM E. WINE.